(12) United States Patent
Khan

(10) Patent No.: US 11,775,562 B2
(45) Date of Patent: Oct. 3, 2023

(54) DISTRIBUTED LEDGERS ON NETWORK GATEWAYS

(71) Applicant: Landis+Gyr Innovations, Inc., Alpharetta, GA (US)

(72) Inventor: Faraz Khan, Alpharetta, GA (US)

(73) Assignee: LANDIS+GYR TECHNOLOGY, INC., Alpharetta, GA (US)

( * ) Notice: Subject to any disclaimer, the term of this patent is extended or adjusted under 35 U.S.C. 154(b) by 239 days.

(21) Appl. No.: 17/199,495

(22) Filed: Mar. 12, 2021

(65) Prior Publication Data
US 2022/0292113 A1    Sep. 15, 2022

(51) Int. Cl.
   *G06F 16/27*       (2019.01)
   *H04L 9/32*        (2006.01)
   *H04L 9/00*        (2022.01)

(52) U.S. Cl.
   CPC .......... *G06F 16/275* (2019.01); *G06F 16/278* (2019.01); *H04L 9/3239* (2013.01); *H04L 9/3247* (2013.01); *H04L 9/50* (2022.05)

(58) Field of Classification Search
   CPC ...... G06F 16/275; G06F 16/278; G06F 21/64; G06F 8/65; H04L 9/3239; H04L 9/3247; H04L 9/50; H04L 63/104; H04L 67/104; H04L 67/34; H04L 63/102; H04L 67/12; H04W 84/18
   See application file for complete search history.

(56) References Cited

U.S. PATENT DOCUMENTS

| | | | |
|---|---|---|---|
| 2019/0230129 | A1* | 7/2019 | Digiambattista ... H04L 63/1433 |
| 2020/0162268 | A1* | 5/2020 | Wentz ...................... H04L 9/50 |
| 2020/0266989 | A1 | 8/2020 | Krcmaricic-Barackov et al. |

(Continued)

FOREIGN PATENT DOCUMENTS

WO    2021036545    3/2021

OTHER PUBLICATIONS

Hammi et al., BCTrust: A Decentralized Authentication Blockchain-Based Mechanism, 2018 IEEE Wireless Communications And Networking Conference (WCNC), Apr. 15, 2018, 6 pages.

(Continued)

*Primary Examiner* — Hosain T Alam
*Assistant Examiner* — Chongsuh Park
(74) *Attorney, Agent, or Firm* — Kilpatrick Townsend & Stockton LLP

(57) ABSTRACT

Techniques are disclosed for using a distributed ledger with a utility network. The utility network includes a set of utility collectors that are connected to a backhaul network. Each of the set of utility collectors includes a memory configured to store a copy of a distributed ledger. The utility network includes personal area networks (PANs). Each of the set of utility collectors is connected to a corresponding PAN and is configured to act as a PAN coordinator for a corresponding set of utility devices on the corresponding PAN. A utility collector requests to join a distributed ledger system. The utility collector receives an approval indicating that the set of utility collectors approve of the request to join the distributed ledger system and a current state of the distributed ledger. The utility collector instantiates a copy of a distributed ledger based on the current state, thereby joining the distributed ledger system.

20 Claims, 7 Drawing Sheets

(56) References Cited

U.S. PATENT DOCUMENTS

2022/0182243 A1* 6/2022 Wang .................. H04L 45/64

OTHER PUBLICATIONS

Kolln et al., Transparent Coordinator Failure Recovery for ZigBee Networks, IEEE Conference on Emerging Technologies & Factory Automation, Sep. 22, 2009, pp. 1-8.
International Application No. PCT/US2022/019986, International Search Report and Written Opinion dated Jun. 22, 2022, 18 pages.

* cited by examiner

DISTRIBUTED LEDGERS ON NETWORK GATEWAYS

TECHNICAL FIELD

This invention relates generally to resource distribution systems and more specifically to resource distribution systems in which network gateways use a distributed ledger system.

BACKGROUND

Modern resource distribution systems use networks of interconnected utility devices (e.g., utility meters) to measure consumption and propagate consumption data to a central system for billing and other purposes. Each utility device is typically connected to part of a communications network (e.g., a wireless mesh network) and each part of a communication network is managed by a utility collector. In turn, the utility collectors aggregate data and pass the data to a central system for billing and other purposes.

SUMMARY

Certain aspects and features include techniques for using a distributed ledger within a resource distribution system. In an example, a utility network includes utility collectors that are connected to a backhaul network. Each of the utility collectors includes a memory configured to store a copy of a distributed ledger. The utility network includes personal area networks (PANs). Each of the utility collectors is connected to a corresponding PAN and is configured to act as a PAN coordinator for a corresponding set of utility devices on the corresponding PAN. A first utility collector of the utility collectors is configured to request an encryption key via the backhaul network. The first utility collector is configured to transmit a request to join a distributed ledger system via the backhaul network. The first utility collector is further configured to receive, via the backhaul network, an approval indicating that a threshold proportion of the utility collectors approve of the request to join the distributed ledger system and a current state of the distributed ledger. The first utility collector is further configured to instantiate the copy of the distributed ledger of the first utility collector using the current state of the distributed ledger, wherein the current state of the distributed ledger includes information about the PANs and the sets of utility devices. The first utility collector is further configured to obtain information about the utility devices associated with the first utility collector. The first utility collector is further configured to encrypt the information about the utility devices associated with the first utility collector with the encryption key and store the information in the distributed ledger. A second utility collector is further configured to identify that a particular utility collector of the utility collectors is unresponsive. The second utility collector is further configured to identify, from the copy of the distributed ledger of the second utility collector, the set of utility devices within a PAN of the unresponsive utility collector. The second utility collector is further configured to cause one or more of the set of utility devices within the PAN of the unresponsive utility collector to join the PAN of the second utility collector. The second utility collector is further configured to update the copy of the distributed ledger of the second utility collector to reflect the joining. The second utility collector is further configured to transmit the update over the backhaul network.

In another aspect, a utility network includes utility collectors that are connected to a backhaul network. Each of the utility collectors includes a memory configured to store a copy of a distributed ledger. The utility network includes personal area networks (PANs). Each of the utility collectors is connected to a corresponding PAN and is configured to act as a PAN coordinator for a corresponding set of utility devices on the corresponding PAN. The first utility collector of the utility collectors is configured to request an encryption key via the backhaul network. The first utility collector of the utility collectors is further configured to transmit a request to join a distributed ledger system via the backhaul network. The first utility collector of the utility collectors is further configured to receive, via the backhaul network, an approval indicating that a threshold proportion of utility collectors approve of the request to join the distributed ledger system and a current state of the distributed ledger. The first utility collector of the utility collectors is further configured to decrypt, using the encryption key, the current state of the distributed ledger. The first utility collector of the utility collectors is further configured to instantiate the copy of the distributed ledger of the first utility collector using the decrypted current state of the distributed ledger. The current state of the distributed ledger includes information about the PANs and the sets of utility devices. A second utility collector of the utility collectors joined to the distributed ledger system is configured to receive a firmware update for a utility collector. The second utility collector of the utility collectors joined to the distributed ledger system is configured to determine, from the copy of the distributed ledger of the second utility collector, that the second utility collector is using a firmware version other than the firmware update. The second utility collector of the utility collectors joined to the distributed ledger system is further configured to apply the firmware update to the second utility collector. The second utility collector of the utility collectors joined to the distributed ledger system is further configured to instantiate a new block indicating that the firmware update has been applied to the second utility collector. The second utility collector of the utility collectors joined to the distributed ledger system is further configured to add the new block to the copy of the distributed ledger of the second utility collector. The second utility collector of the utility collectors joined to the distributed ledger system is further configured to transmit the new block to at least one other collector.

In another aspect, a utility network includes utility collectors that are connected to a backhaul network. Each of the utility collectors includes a memory configured to store a copy of a distributed ledger. The utility network includes personal area networks (PANs). Each of the utility collectors is connected to a corresponding PAN and is configured to act as a PAN coordinator for a corresponding set of utility devices on the corresponding PAN. A first utility collector of the utility collectors is configured to transmit, via the backhaul network, a request to join a distributed ledger system. The first utility collector of the utility collectors is further configured to receive, via the backhaul network, an approval indicating that a threshold proportion of the utility collectors approve of the request to join the distributed ledger system and a current state of the distributed ledger. The first utility collector of the utility collectors is configured to instantiate the copy of the distributed ledger of the first utility collector using the current state of the distributed ledger. The current state of the distributed ledger includes information about the PANs and the sets of utility devices. The first utility collector of the utility collectors is configured to obtain a first network topology about utility devices associated with the first utility collector. The first utility collector of the utility collectors is further configured to store information about the first network topology in the distributed ledger. A second utility collector of the utility collectors joined to the distributed ledger system is configured to, responsive to transmitting one or more network pings to the first utility collector, identifying that the first utility collector is unresponsive. The second utility collector of the utility collectors joined to the distributed ledger system is further configured to access, from the copy of the distributed ledger of the second utility collector, the information about the first network topology. The second utility collector of the utility collectors joined to the distributed ledger system is further configured to identify, from the information about the first network topology, one more utility devices of the set of utility devices. The second utility collector of the utility collectors joined to the distributed ledger system is configured to cause the one or more utility devices to join the PAN of the second utility collector.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Disclosed solutions relate to resource distribution networks that use a distributed ledger system. Resource distribution networks include utility networks such as electric, gas, or water distribution networks. A distributed ledger system refers to a system of devices that collectively operate from a ledger, a copy of which is maintained on each device. An example of a distributed ledger is a block chain.

Resource distribution networks include many utility devices that measure parameters such as resource consumption or status of a resource. Devices on resource distribution networks are typically connected by one or more communications networks, which provide a mechanism by which data can be aggregated and passed to a central system, for example, for billing purposes or analytics. Groups of metering devices can be clustered into separate personal area networks (PAN), for example, by geographic area, with each PAN aggregated by an individual gateway, or collector.

But in existing systems, collectors are often configured in a manner such that each collector only knows about the utility devices on a corresponding personal area network and is unaware of the network at large. This configuration by nature can limit the use of advanced applications.

By contrast, certain aspects use a distributed ledger to maintain records of collectors, PANs, utility devices, and other information. The distributed ledger can be cryptographically secure. Therefore, disclosed systems are more fault resistant, are more secure, and can enable decentralized applications. For example, by using a distributed ledger, a given utility collector can maintain a state of the other utility collectors, for instance, whether the other utility collectors are active, whether there are any issues with connectivity (for instance, with the utility devices), a current version of firmware update installed on the devices, and so forth. In the event of a network outage with respect to one collector, another collector can obtain a current state from the distributed ledger and re-establish communications with any stranded devices. Additionally, network updates, device updates, or applications can be propagated between devices and collectors, with minimal or no involvement from a head end system.

Figure 1:
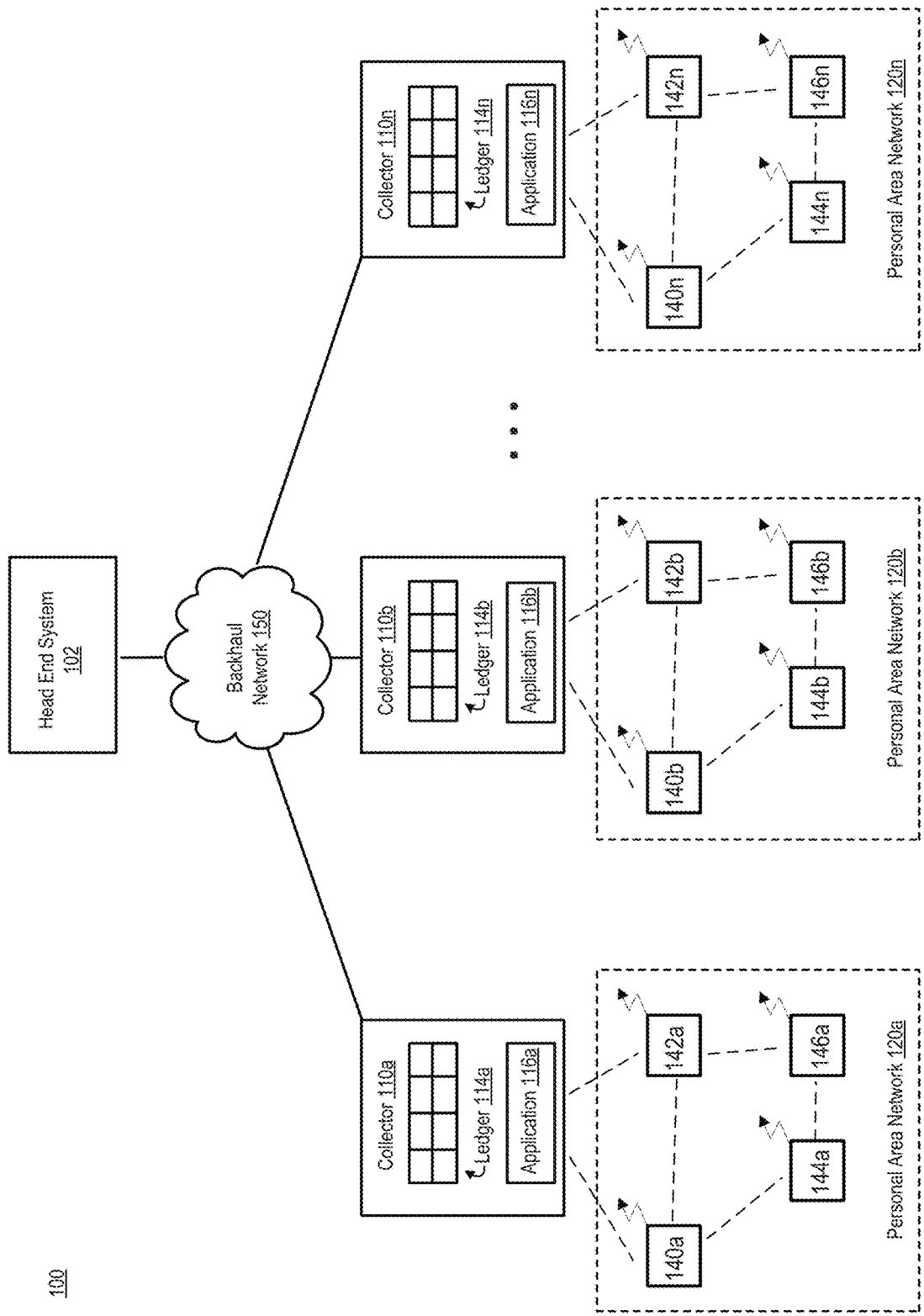
FIG. 1 illustrates an exemplary communication network topology of a resource distribution network, in accordance with an aspect.

Turning now to the Figures, FIG. 1 illustrates an exemplary communication network topology of a resource distribution network, in accordance with an aspect. FIG. 1 depicts communication network 100, which includes head end system 102, backhaul network 150, collectors 110a-n, and personal area networks (PANs) 120a-n. In the example depicted by FIG. 1, head end system 102 communicates via backhaul network 150 to collectors 110a-n. Backhaul network 150 can be a wired network (e.g., Ethernet or fiber optic cable), a wireless network (e.g., cellular), or a combination of both. While utility devices may be located at an end user premises, communication network 100 is fundamentally different from a topology of the resource distribution network itself, as a communications network is structured based on connectivity between devices rather than the resource itself.

Collectors 110a-n communicate with personal area networks (PANs) 120a-n respectively. Each collector 110a-n can be a Personal Area Network (PAN) coordinator for a corresponding PAN. For instance, collector 110a communicates with utility devices 140a, 142a, 144a, and 146a; collector 110b communicates with utility devices 140b, 142b, 144b, and 146b; and collector 110n communicates with utility devices 140n, 142n, 144n, and 146n. Each utility device can communicate wirelessly with one or more other devices across one or more PANs.

While each of PANS 120a-n include four utility devices for illustration purposes, any number of utility devices is possible. For instance, a personal area network can include hundreds of utility devices. Therefore, there can exist one or more different communication paths between utility devices. Further, a given utility device may not connect directly with a collector. A PAN may be a wireless network or a wireless mesh network that uses a wireless protocol, such as the WiFi, Bluetooth, ZigBee, and IEEE 802.15 protocols or a proprietary protocol.

Utility devices are generally utility meters located at end user premises (e.g., at a point of service), but can also include other measurement devices connected to power lines, transformers, capacitor banks, and so forth. A utility device can include one or more computing systems. Therefore, utility devices can implement functionality such as Advanced Metering Infrastructure (AMI) functionality, which can include capturing, processing, and transmitting metering and resource information.

Two or more of collectors 110a-n can use a distributed ledger system. For instance, each collector 110a-n can maintain one or more copies of a distributed ledger that includes information about the collectors, associated devices, and PANs. As depicted, collector 110a includes ledger 114a, collector 110b includes ledger 114b, and collector 110n includes ledger 114n.

Each ledger 114a-n can include information about the collector on which it is stored, other collectors connected to the backhaul network, utility devices on the personal area network corresponding to the collector, or utility devices on another personal area network. Any changes or updates made on one collector to the distributed ledger are propagated across the backhaul network. An example of a distributed ledger is discussed further with respect to FIG. 2.

Using the distributed ledger system, collectors 110a-n can perform tasks traditionally performed by head end system 102. Examples of tasks are discussed further with respect to FIGS. 3-6. For example, a collector may execute distributed applications, join a distributed ledger system, approve another collector to join a distributed ledger system, leave a distributed ledger system, recover a loss in connectivity caused by an outage of one or more devices, or distribute a firmware update. An example of a computing device suitable for performing such operations within a collector or a utility device is shown in FIG. 7.

Each collector 110a-n includes one or more applications. As depicted, collector 110a includes application 116a, collector 110b includes application 116b, and collector 110n includes application 116n. A collector may execute one or more applications, each of which can operate in a distributed manner. Examples of applications include performing data analysis or distributing software or firmware updates.

Figure 2:
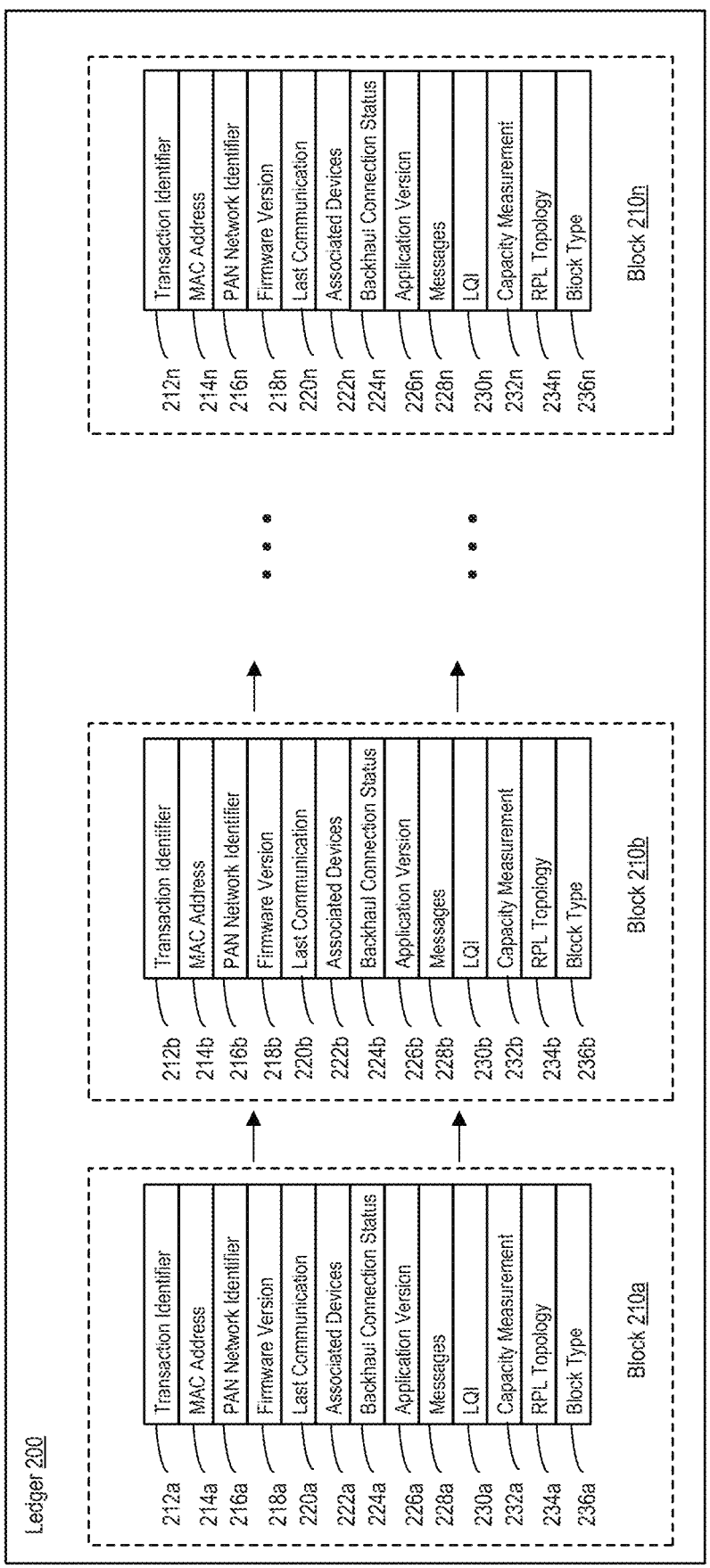
FIG. 2 illustrates an exemplary ledger, in accordance with an aspect.

FIG. 2 illustrates an exemplary ledger, in accordance with an aspect. FIG. 2 depicts ledger 200. Ledger 200 is an example of ledgers 114a-n. Ledger 200 can be used to store information about collectors 110a-n, the utility devices on the PANs managed by the collectors 110a-n, utility information obtained from other devices, which version of firmware the collectors or utility devices are running, and so forth. As discussed further with respect to FIGS. 3 and 4, such information can be used to join a distributed ledger system and/or recover from a collector failure.

Ledger 200 can be organized as a table, linked list, block chain, or any other data structure. A block chain refers to a continuously growing list of records, or blocks, which can be linked and secured using cryptography. For instance, as shown, ledger 200 is organized in a block chain including blocks 210a-n. Therefore, ledger 200 may also be referred to as a block chain or a block chain data structure. While three blocks are depicted, any number of blocks is possible.

Blocks 210a-n can be of different types and can be read and written by any collector. Further, blocks may be added to the ledger by one or more of the collectors 110a-n or by other devices. For example, a first collector may add a block indicating that it sent information to a second collector. The second collector may then add another block indicating that the information was received from the first collector.

Each block 210a-n includes one or more fields. Each field can include information about or a transaction associated with a collector or a utility device. For instance, block 210a includes transaction identifier field 212a, MAC address field 214a, PAN network identifier field 216a, firmware version field 218a, last communication field 220a, associated devices field 222a, backhaul connection status 224a, application version 226a, messages 228a, link quality index (LQI) 230a, capacity measurement 232a, Routing Protocol for Low-power, Lossy Networks (RPL) topology 234a, and block type 236a; block 210b includes a transaction identifier field 212b, MAC address field 214b, PAN network identifier field 216b, firmware version field 218b, last communication field 220b, associated devices field 222b, backhaul connection status 224b, application version 226b, messages 228b, link quality index (LQI) 230b, capacity measurement 232b, Routing Protocol for Low-power and Lossy Networks (RPL) topology 234b, block type 236b; and block 210n includes transaction identifier field 212n, MAC address field 214n, PAN network identifier field 216n, firmware version field 218n, last communication field 220n, associated devices field 222n, backhaul connection status 224n, application version 226n, messages 228n, link quality index (LQI) 230n, capacity measurement 232n, Routing Protocol for Low-power and Lossy Networks (RPL) topology 234n, and block type 236n. Additional fields are possible.

Transaction identifier fields 212a-n each identify a transaction associated with the corresponding block. Examples of a transaction identifier include a sequential number indicating the order in which a particular transaction was received or processed or a timestamp of when the transaction was recorded.

MAC address fields 214a-n are the Media Access Layer (MAC) addresses of the device associated with the respective block. For instance, if a block represents a transaction in which collector 110a joined the distributed ledger, then the corresponding MAC address field 214a can be the MAC address of collector 110a.

PAN network identifier field 216a is the identifier (e.g., MAC address) of the collector that corresponds to the PAN on which the particular device is operating. A corresponding MAC address field 214a-n and PAN address field 216a-n can be related to a collector that created the corresponding block.

Each firmware version fields 218a-n is a version number of a particular firmware running on the corresponding device. This information facilitates a collector being able to cause the firmware of a collector or a utility device to be updated.

Each last communication field 220a-n can be a time of the last known communication of the particular device. Each associated devices field 222a-n refers to the one or more devices associated with the transaction or the block. For instance, if a block refers to a collector joining the network, then the associated devices field can include the utility devices on the PAN of the particular collector.

Each backhaul connection status field 224a-n indicates a status of the backhaul connection. For instance, if a given block is associated with a collector, then the corresponding backhaul connection status field indicates whether that collector is connected to the backhaul. In some cases, the value of the connection status field 224a-n includes a number indicating whether the backhaul is connected (e.g., 1), disconnected (e.g., 0), or the connection status is unknown (e.g., 9).

Each application version field 226a-n indicates a version of a current application running on the corresponding collector. Each collector can execute one or more applications. The applications are distinct from the underlying firmware running on the collector. The application version can be used by a collector to verify whether the collector is running the latest version of an application, and update the application accordingly.

Each messages field 228*a-n* includes references to messages or an array of messages to be transferred to a head end system. For instance, each messages field 228*a-n* include readings or event data originating from utility devices in the PAN for that collector that should be transferred to a head end system.

Each link quality index (LQI) field 230*a-n* indicates a quality of either the backhaul or a quality index of the devices in the corresponding PAN. The LQI field can include an average or aggregated LQI for the devices in the PAN can be used. In an aspect, if a link quality falls below a threshold level, then a collector may reroute traffic.

Each Routing Protocol for Low-power and Lossy Networks (RPL) topology field 234*a-n* includes routing information about a corresponding PAN. For instance, the RPL topology field 234*a-n* can include a topology graph showing the logical tree of the PAN devices and how many link layers have been formed within the PAN. In this manner, if a first collector loses connectivity, then a second collector can easily determine the topology of the PAN of the first collector from the ledger.

Each capacity measurement field 232*a-n* indicates a capacity of the corresponding PAN. In an example, the capacity measurement field 232*a-n* can include number of devices on the PAN. This can be used by an application to perform operations such as load distribution, load shedding, splitting devices across PANs, or alerting a head end system about errors.

Each block type field 236*a-n* indicates a type of a particular block. Examples of block types include a new-device block (indicating that a new device joined a PAN), a new collector block (indicating that a new collector joined the backhaul network), a device offline block (indicating that a device appeared to be offline or disconnected), and a new collector request block (indicating that a new collector requested to join the distributed network).

In an aspect in which the distributed ledger is implemented as a block chain, each block 210*a-n* contains a cryptographic hash of the previous block, a timestamp transaction, and other information. Each block can correspond to a transaction of a utility device or collector. A transaction can be a signed data structure expressing a transfer of information. Examples of transactions include joining the network, leaving the network, sending a message, and requesting an encryption key. Therefore, ledger 200 can be made inherently resistant to modification of data that is stored in blocks 210*a-n*. In some cases, once recorded, the data in any given block cannot be altered retroactively without the alteration of all subsequent blocks, which may require an agreement of threshold proportion (e.g., a majority or a plurality) of network devices. In this manner, changing data associated with old transactions is not feasible, because such a change would require regeneration of hashes for every subsequent transaction/block including the block in which the change is desired.

Every node in ledger 200 can be synchronized with the distributed ledger at large, e.g., the copies of the ledger on other devices (such as other collectors 110*a-n*). Synchronization can include transmitting one or more blocks of the ledger across the backhaul network. After synchronization is complete, other collectors have exactly the same copy or access to the same copy of the entire ledger. Additionally, any collector can verify the authenticity and integrity of the ledger by performing cryptographic operations on the hashes embedded in blocks 210*a-n*.

A current state of ledger 200 includes all of the blocks 210*a-n*. The current state therefore includes information about the plurality of PANs such as the utility devices on each PAN, each transaction adding or removing a device, a current version of firmware for each device, and so forth. A current state of a ledger can be determined for different purposes, such as enabling a new collector to join the distributed ledger system.

One or more distributed applications can implement a process or an algorithm can be automated and shared amongst the nodes on the network. For example, a collector can monitor one or more other collectors. A first collector can send an Internet Control Message Protocol (IMCP) ping to one or more other collectors on a periodic basis to determine whether the other collectors are connected to the backhaul network. In another example, each collector can send updates periodically to other collectors. Such updates can be recorded in the distributed ledger. One or more collectors can send periodic updates to a head end system.

In another example, a first collector can verify data flow from a second collector. If no data is reported for a threshold amount of time, then an alert can be raised.

Given the distributed nature of the network, such processes or algorithms can be executed with a certain reliability when an event is triggered on the network. An example of an event is a specific time being reached (e.g., late at night), or an update from a head end system. Such processes or algorithms can execute on one or more collectors. In this manner, the network can operate autonomously without the reliance on the head end system. Additionally, due to the decentralized nature of the network, these applications can execute on the collectors and be shared across the network without a need to replicate on all collectors. This approach can reduce any time for firmware upgrades, thereby keeping the network uptime high.

A collector that is not part of the distributed ledger system can request to join the system. An example of such a process is described in FIG. 3.

Figure 3:
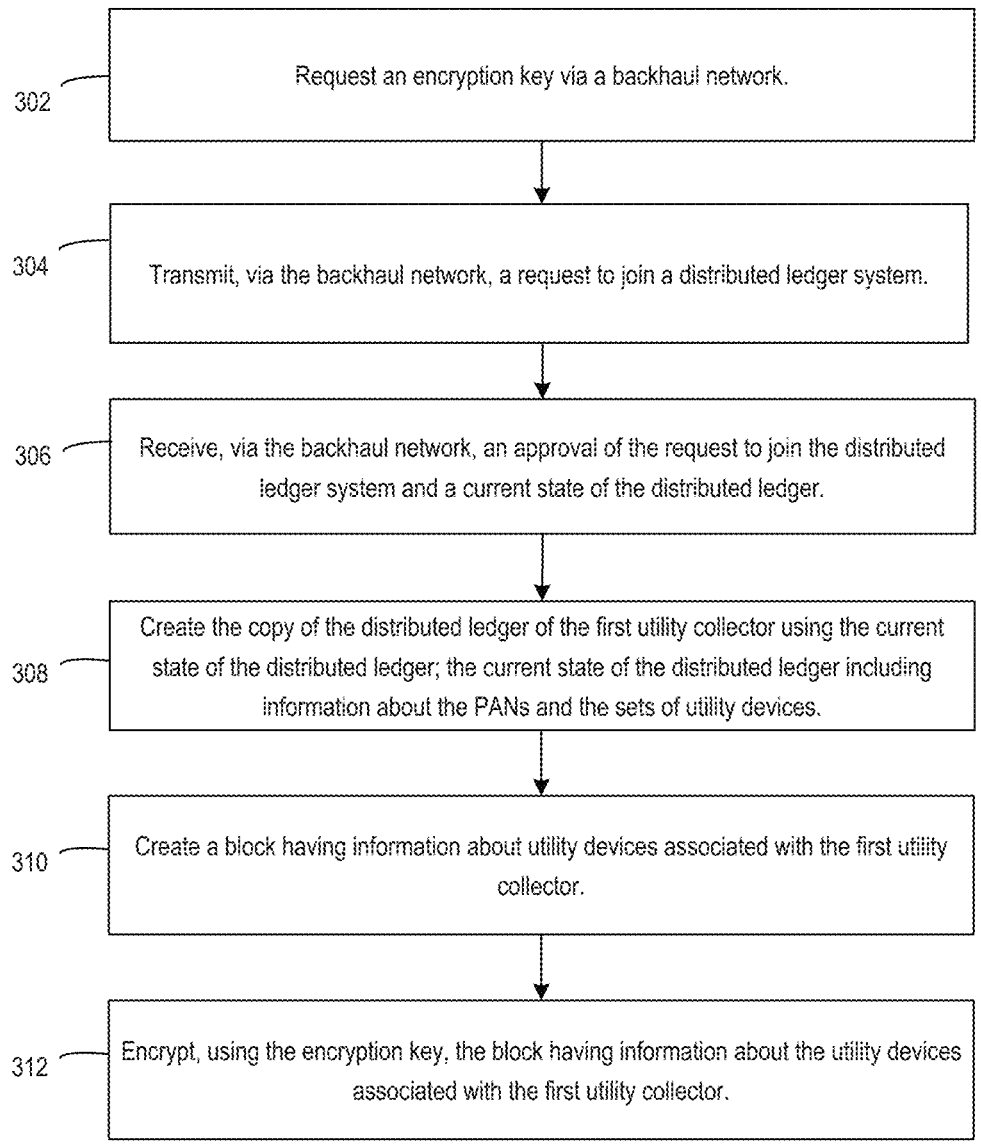
FIG. 3 is a flowchart illustrating an exemplary process for joining a system of utility collectors using a distributed ledger system, in accordance with an aspect.

FIG. 3 is a flowchart illustrating an exemplary process 300 for joining a system of utility collectors using a distributed ledger system, in accordance with an aspect. It will be appreciated that the operations described in process 300 can be performed in a different order and/or one or more operations of process 300 need not be performed. Process 300 can be used by a collector that is not part of a distributed ledger system and wishes to join the system.

For example purposes, process 300 is described as performed by collector 110*a* operating on a copy of ledger 200. But process 300 can be performed by any collector 110*a-n*. A collector may join the backhaul network separately from or together with joining the distributed ledger system. For example, in some cases, before process 300 is initiated, collector 110*a* can be joined to the backhaul network and can communicate with head end system 102. In another example, collector 110*a* can join the backhaul network as part of process 300, e.g., with the request to join the distributed ledger.

At block 302, process 300 involves requesting an encryption key via the backhaul network. The encryption key allows a utility collector to encrypt a copy of the distributed ledger and/or blocks within a copy of the distributed ledger. While for example purposes, the encryption key is described as being requested from the head end system 102, the encryption key can be requested from another device such as one of the collectors 110b-n.

Continuing the example, collector 110a requests an encryption key from head end system 102 via backhaul network 150. In turn, head end system 102 transmits the encryption key to collector 110a. Once a collector receives the encryption key, the collector can request to join the distributed ledger system.

The transaction of requesting and/or transmitting the encryption key can be stored in the ledger. For instance, a different collector, e.g., collector 110b, can instantiate, or create, a block (for instance, a block 210a-n) representing the transaction. Collector 110b (or another collector that did not make the request) can then store the generated block in the copy of the distributed ledger. The updates can be automatically propagated to the other collectors across the backhaul network. In some cases, collector 110a can transmit, to another collector, an acknowledgement that the encryption key was received, causing a transaction to be recorded.

At block 304, process 300 involves transmitting, via the backhaul network, a request to join a distributed ledger system. The request can be sent directly to the other collectors 110b-n or to a single collector, which then propagates the request to the other collectors.

Continuing the example, collector 110a transmits a request to join the distributed ledger system via backhaul network 150. The request can include information about collector 110a, such as the MAC addresses of collector 110a and/or an application version 226a.

In some cases, blocks 302 and 304 can be combined. Therefore, a request for an encryption key and a request to join the distributed ledger can be sent in the same request.

A decision about whether a particular collector may join the distributed ledger system can be made by the head end system 102, one or more of the collectors 110b-n, or some combination thereof. For example, the decision can be based on whether collector 110a is on a pre-approved access list stored by the head end system 102 or by a collector 110b-n. In some cases, the decision can be made by collectors 110b-n based on information from head end system 102 and/or provided to the collectors. For example, head end system 102 can provide encryption keys to collector 110a, and the approval by collectors 110b-n can be based on the collector 110a having the encryption keys.

In another example, a consensus approach can be used to decide whether a particular collector may join an existing distributed ledger system. The consensus approach involves querying the collectors. In this approach, approval of a request to join the system may require that a certain threshold, e.g., a certain number or proportion of utility collectors, approve the request. Examples of suitable thresholds of collectors include a majority of collectors, a plurality of collectors, and so forth. The consensus approach may include one or more methods such as the RAFT Consensus Algorithm (RAFT), Paxos protocol, or the Byzantine Fault Tolerance protocols (pBFT, sBFT, dBFT). The consensus method allows collectors 110b-n to agree on a validity of the request transaction submitted by the requesting collector 110a.

At block 306, process 300 involves receiving, via the backhaul network, an approval of the request to join the distributed ledger system and a current state of the distributed ledger.

Continuing the example, collector 110a receives an approval to join the distributed ledger system. At this point, collector 110a can start using the distributed ledger system, for example, access a copy of the distributed ledger or communicate with other collectors. An update reflecting the approval can be stored in a block of the ledger and the update automatically propagated to the other collectors across the backhaul networks.

A block indicating a transaction of requesting to join or joining the distributed ledger can be stored in the ledger. For instance, collector 110a can instantiate a block (for instance, a block 210a-n) and store the generated block in the copy of the distributed ledger.

At block 308, process 300 involves creating the copy of the distributed ledger of the first utility collector using the current state of the distributed ledger, wherein the current state of the distributed ledger comprises information about the plurality of PANs and the sets of utility devices. Continuing the example, collector 110a instantiates a copy of the distributed ledger using the current state of the ledger.

At block 310, process 300 involves creating a block having information about the utility devices associated with the first utility collector. Continuing the example, collector 110a, which communicates with PAN 120a, creates a block that includes information regarding utility devices 140n, 142n, 144n, and 146n. Collector 110a writes this block to the distributed ledger and causes the block to be propagated to the other collectors 110b-n.

At block 312, process 300 involves encrypting the block having information about the utility devices associated with the first utility collector with the encryption key. Continuing the example, collector 110a encrypts the copy of the distributed ledger and saves the copy of the distributed ledger. Collector 110a can save the encrypted copy of the ledger in a memory in the collector 110a. In some cases, collector 110a can store the copy of the ledger on an external or network device.

Figure 4:
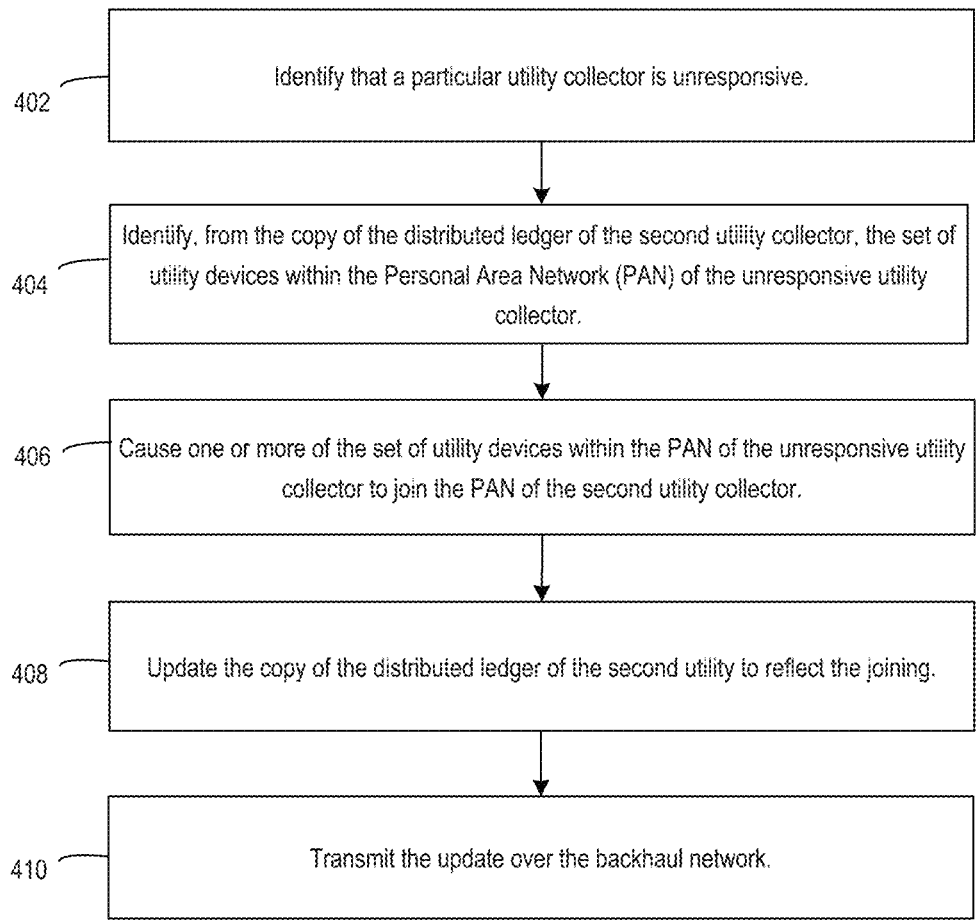
FIG. 4 is a flowchart illustrating an exemplary process for recovering from an outage of a utility collector using a distributed ledger system, in accordance with an aspect.

An advantage of utility collectors that use the distributed ledger system is failure recovery. Examples of causes include utility device hardware failure, power failure, or network connectivity issues. For instance, if a collector has gone offline, then the utility devices on the PAN of which the collector is a coordinator may no longer be able to communicate their consumption data to the head end system, and therefore a utility company may have to manually collect the billing data or the billing data is delayed in delivery to the head end system. By using the distributed ledger, the utility network can determine that the collector is offline and one or more other collectors can cause the stranded utility meters to reconnect to a different PAN. FIG. 4 shows an example of a process for handing such a case.

FIG. 4 is a flowchart illustrating an exemplary process 400 for recovering from an outage of a utility collector using a distributed ledger system, in accordance with an aspect. It will be appreciated that the operations described in process 400 can be performed in a different order and/or one or more operations of process 400 need not be performed.

At block 402, process 400 involves identifying that a particular utility collector is unresponsive. For example purposes, process 400 is described as performed by collector 110b. For example, collector 110b transmits a message to collector 110a. Collector 110b can wait a predetermined amount of time. If there is no response after this time, then collector 110b can attempt to reach collector 110a again. After a predetermined amount of time and/or number of attempts, then collector 110b can deem collector 110a unavailable.

An update reflecting the determination of the unresponsive collector can be stored in a block of the ledger and the update automatically propagated to the other collectors across the backhaul networks. For instance, collector 110*b* can instantiate a new block including an indication that the collector 110*a* is unresponsive and store the new block in the copy of the distributed ledger of collector 110*b*.

At block 404, process 400 involves identifying, from the copy of the distributed ledger of the second utility collector, the set of utility devices within a PAN of the unresponsive utility collector. For example, collector 110*b* accesses the copy of the distributed ledger stored in collector 110*b*. From the copy of the distributed ledger, collector 110*b* determines the PAN associated with collector 110*a*, e.g., PAN 120*a*. Collector 110*b* determines any utility devices identified on PAN 120*a*. In the case that ledger 200 is stored in a block chain and that there is a transaction indicating every utility device on one or more PANs stored in the ledger, then collector 110*b* steps through the blocks in ledger 200 and forms a list of the devices associated with PAN 120*a*. In other cases, ledger 200 may not have a transaction indicating an identity of each utility device and block 404 may involve queries to other data structures or devices to determine the identity of each utility device previously connected to the unresponsive collector.

An update reflecting the determination of the unresponsive collector can be stored in a block of the ledger and the update automatically propagated to the other collectors across the backhaul networks.

At block 406, process 400 involves causing one or more of the set of utility devices within the PAN of the unresponsive utility collector to join the PAN 120*b*. Collector 110*b* attempts to communicate with each of the utility devices of PAN 120*a*. If the collector 110*b* is successful in reaching a utility device, then collector 110*b* causes the utility device to connect to a different PAN, such as PAN 120*b*. A determination of which PAN to join can be made by the utility device determining another collector having a minimum distance or maximum detected signal strength. Collector 110*b* continues this process until all the utility devices associated with PAN 120*a* have been reassigned to different PANs. The PAN of collector 110*a* is destroyed and the associated utility devices move to PAN 120*b*.

An update reflecting the addition of a new utility device to PAN 120*b* can be stored in a block of the ledger and the update automatically propagated to the other collectors across the backhaul networks. For instance, collector 110*b* can instantiate a new block including an indication that a particular device was contacted, reached, and/or added to PAN 120*b*. Collector 110*b* can then store the new block in the copy of the distributed ledger of collector 110*b*.

At block 408, process 400 involves updating the copy of the distributed ledger of the second utility to reflect the joining. Collector 110*b* updates the ledger to reflect the changes. For instance, collector 110*b* adds a block to reflect each utility device previously on PAN 120*a* and now on another PAN.

At block 410, process 400 involves transmitting the update over the backhaul network. Collector 110*b* transmits the updated ledger and/or blocks(s) across the backhaul network so that other collectors 110*c-n* can access the changes and update their respective ledgers.

In an aspect, the distributed ledger system can be used to distribute or manage firmware updates for the collectors and/or the utility devices. For instance, a given collector can receive a firmware update from another collector 110*a-n* or head end system 102. The collector can then determine whether the firmware has been applied by reading the ledger. If the firmware is a firmware version other than the version of the firmware update, then the collector can update its own firmware and/or propagate the firmware to other collectors.

Updates reflecting firmware availability or updates can be stored in one or more blocks of the ledger and can be automatically propagated to the other collectors across the backhaul networks. For instance, collector 110*b* can instantiate a new block including an indication that the firmware of collector 110*b* was updated.

A similar process can be employed with firmware updates to individual utility devices. For instance, collector 110*a* can receive an indication of the updated utility device firmware from head end system 102. Collector 110*a* then causes utility devices on PAN 120*a* (e.g., utility devices 140*a*, 142*a*, 144*a*, and 146*a*) to receive the updated firmware and to install the updated firmware. The firmware itself or an indication of the availability of the firmware can then be propagated to other collectors, which in turn, can cause other connected utility devices to be updated. These updates can be logged in the ledger and the changes propagated throughout the network.

In another example, a collector 110*a-n* can provide a firmware update directly to a utility meter that is connected to the collector (e.g., via a PAN). For instance, collector 110*a* can receive an indication of the updated utility device firmware from the ledger or from another collector. Collector 110*a* then causes utility devices on PAN 120*a* (e.g., utility devices 140*a*, 142*a*, 144*a*, and 146*a*) to receive the updated firmware and to install the updated firmware.

In yet another example, a collector 110*a-n* can update the application software running on the collector. For example, a first collector can determine, from the copy of the distributed ledger a version of an application running on the first collector (or another collector). If the version is less than a current version, the first collector can access or download an application update that corresponds to the current version and apply the application update to the first collector. The first collector can instantiate a new block indicating that the application update has been applied and the new block the corresponding copy of the distributed ledger. The block can then be propagated between collectors.

Figure 5:
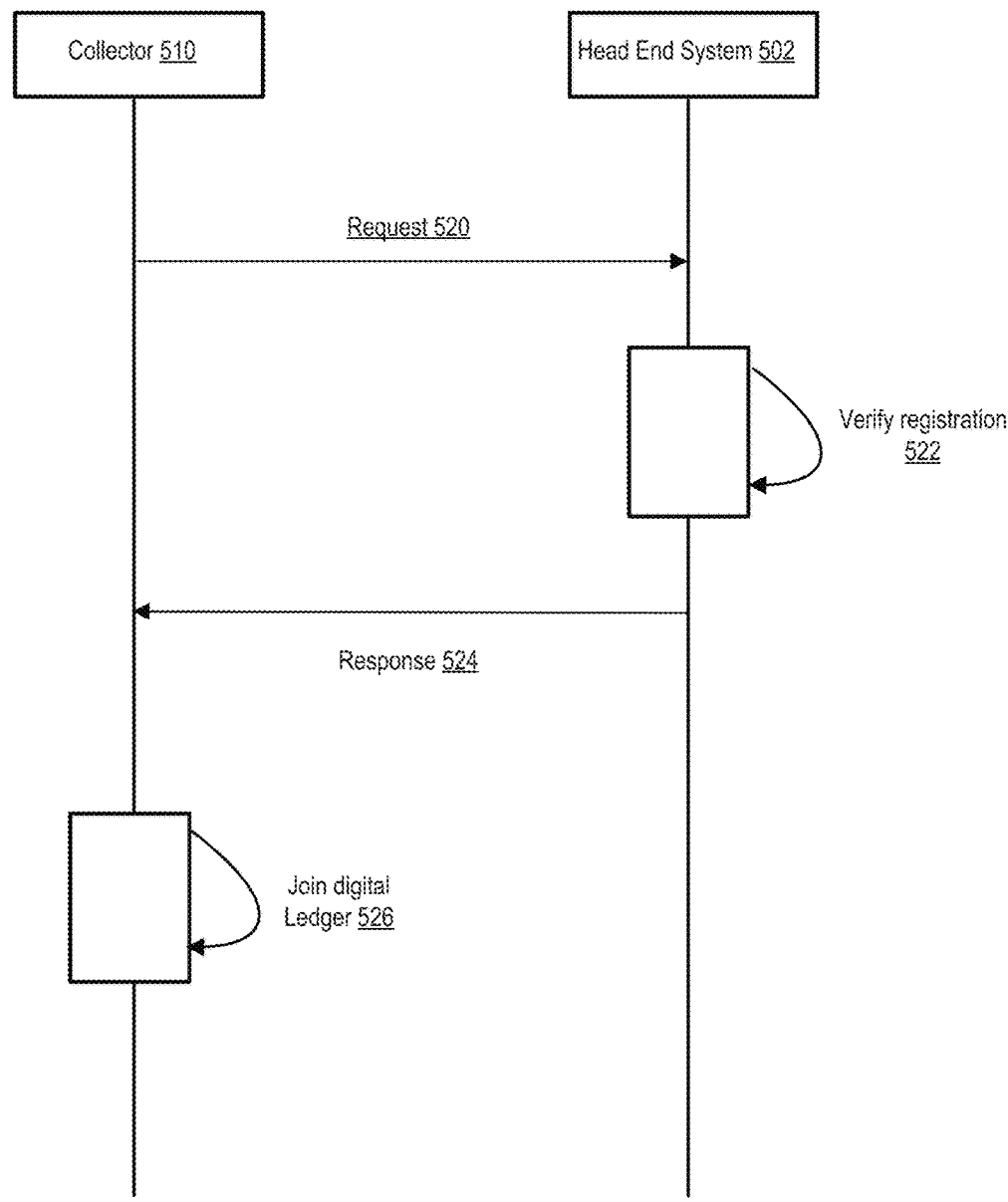
FIG. 5 is a signal flow diagram depicting exemplary signals between a collector and a head end system, in accordance with an aspect.

FIG. 5 is a signal flow diagram 500 depicting exemplary signals between a collector and a head end system, in accordance with an aspect. Signal flow diagram 500 depicts examples of signals between collector 510 and head end system 502 that can occur as part of collector 510 requesting to join and joining a distributed ledger system. In some cases, collector 510 is already part of the backhaul network. In other cases, collector 510 can request to join the backhaul network as part of the process of joining the distributed ledger system.

As discussed with respect to FIG. 3, some or all of these operations that involve a head end system can instead use another collector that is already part of the distributed ledger system.

Initially, collector 510 sends request 520 to head end system 502. Request can include information about collector 510 such as a network address, type, manufacturer, etc., of collector 510.

Next, at operation 522, head end system 502 processes the registration by verifying that collector 510 is permitted to join the distributed ledger system. For example, head end system 502 verifies that collector 510 is in an approved database of collectors.

In response, at operation 524, head end system 502 sends a response to collector 510. In the case that the head end system 502 approves collector 510 joining the distributed ledger system, then the response includes an approval and can include an encryption key for use with the ledger. In the case that head end system 502 does not approve collector 510 joining the distributed ledger system, then response indicates that there is not an approval and does not include an encryption key. The approval can cause one or more blocks to be written to the distributed ledger.

As discussed above, in some cases, the verification of the registration can be dependent on a consensus method of the collectors. In other cases, head end system 502 can determine whether collector 510 can join and then transmit the permission to one or more of the collectors.

Continuing the example, if collector 510 is approved to join the distributed ledger system, then collector 510 does so at operation 526.

Figure 6:
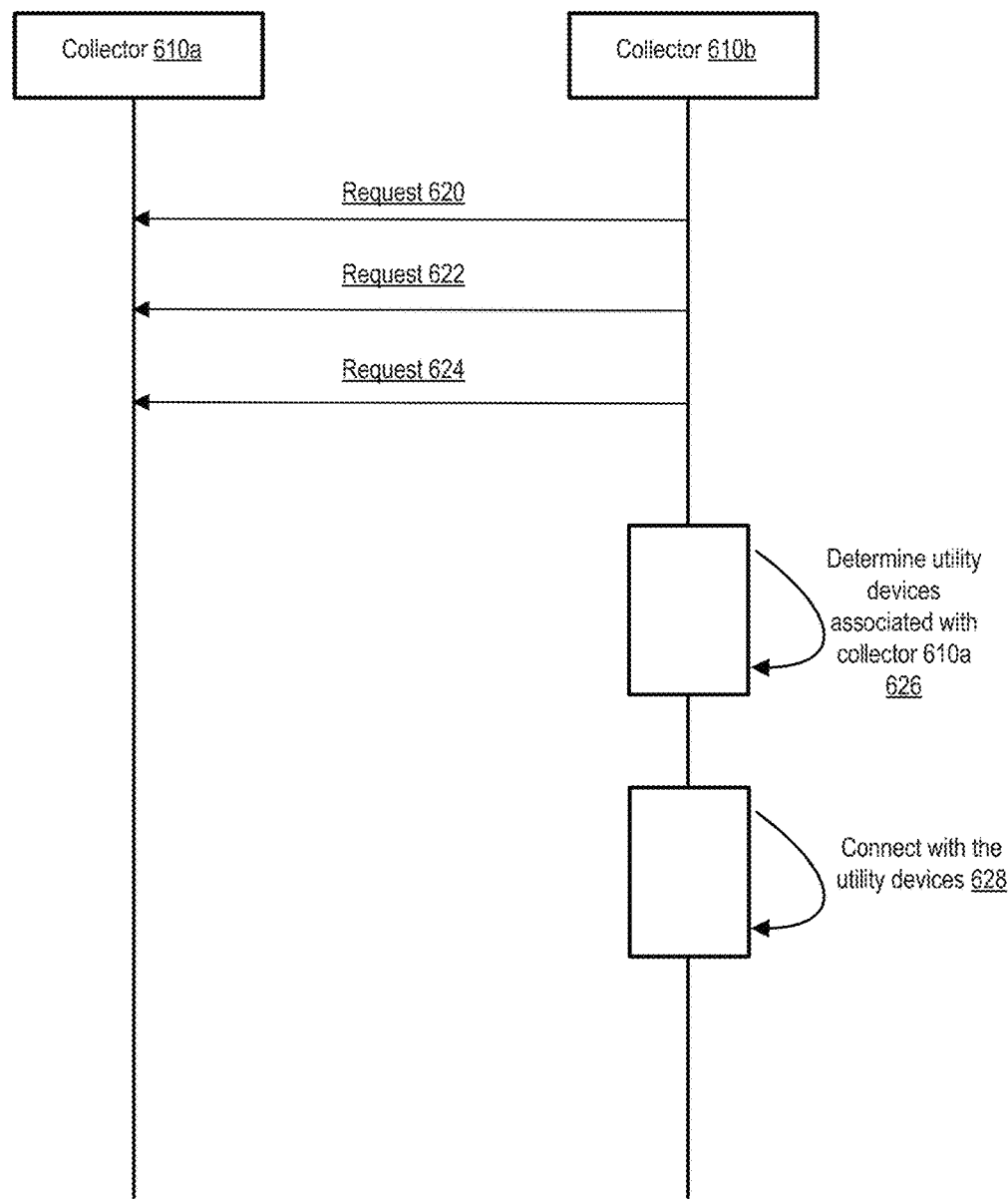
FIG. 6 is a signal flow diagram depicting exemplary signals between two utility collectors, in accordance with an aspect.
Figure 7:
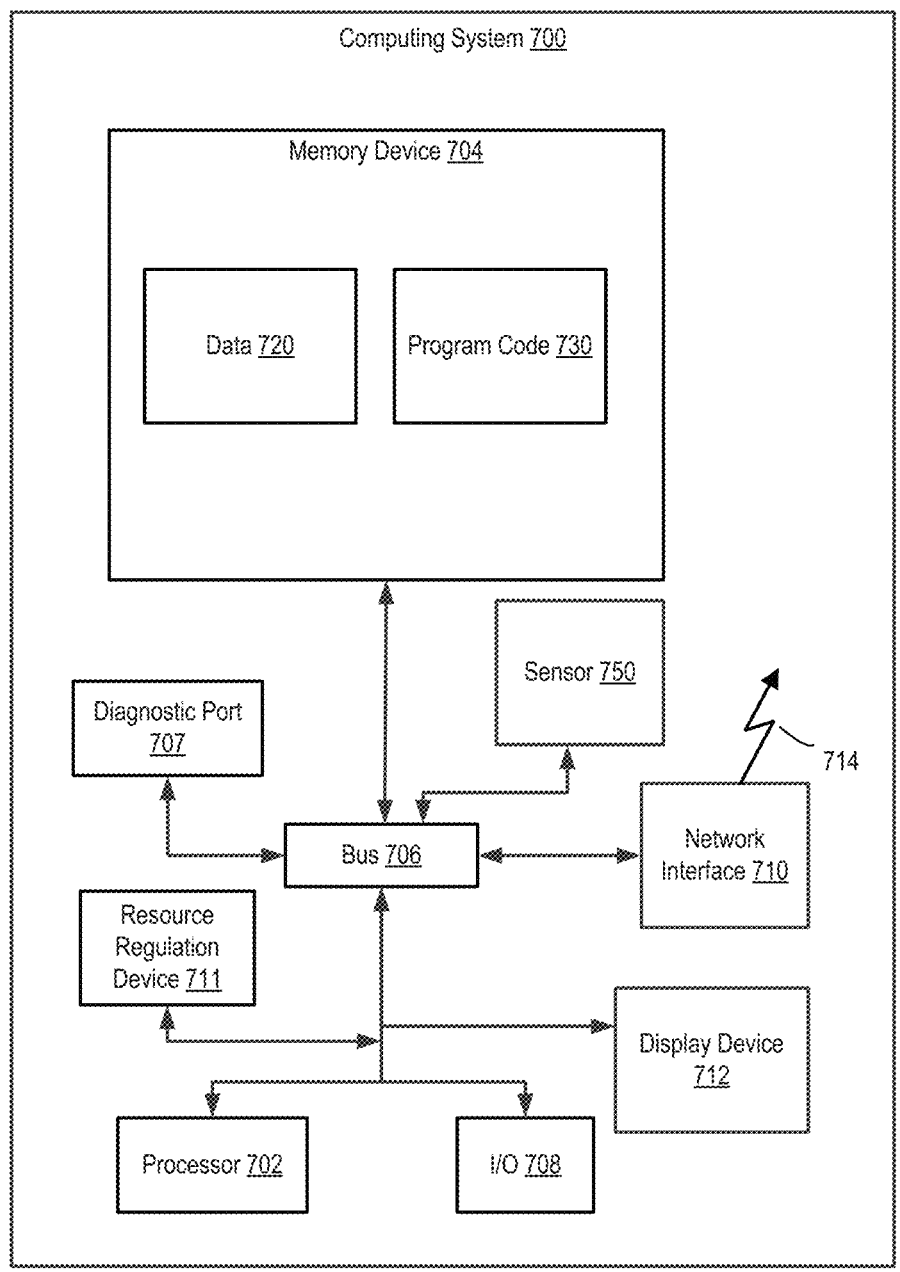
FIG. 7 illustrates an exemplary computing system that can be used in a collector or a metering device, in accordance with an aspect.

FIG. 6 is a signal flow diagram 600 depicting exemplary signals between two utility collectors, in accordance with an aspect. Signal flow diagram 600 depicts examples of signals between collectors 610a and 610b.

In the example depicted, collector 610b sends one or more requests 620-624 to collector 610a. For instance, collector 610b can send a first request 620 and wait a period of time. If no response is received, then collector 610b sends a second request 622, and so forth. After a predetermined number of requests, collector 610b determines that collector 610a is unavailable. At this point, collector 610a may take action or cause another collector to do so, for example, via a distributed application executing on one or more collectors.

At operation 626, collector 610b determines utility devices that are associated with collector 610a. This determination can be made from accessing the copy of the distributed ledger that is stored on collector 610b. For example, collector 610b can step through the blocks in the copy of the ledger to determine all utility devices that joined the PAN associated with collector 610a.

At operation 628, collector 610b connects with each of the devices identified at operation 626. Collector 610b causes each device to join a PAN that is operational. The stranded devices may join one or more PANs, for example, based on signal strength or distance from the respective device.

FIG. 7 illustrates an exemplary computing system that can be used in a collector or a metering device, in accordance with an aspect. Any suitable computing system may be used for performing the operations described herein. The depicted example of a computing system 700 includes a processor 702 communicatively coupled to one or more memory devices 704. The processor 702 executes computer-executable program code 730 stored in a memory device 704, accesses data 720 stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices or cores, including a single processing device. The functionality of the computing system may be implemented in hardware, software, firmware, or a combination thereof.

The computing system 700 can include a sensor 750 configured to measure parameters relating to the resource of a resource distribution network. For example, in an electricity distribution system, the sensor 750 can measure power consumption, voltage, current, etc. In a gas distribution system, the sensor 750 may measure flow rate. In some aspects, the computing system 700 may include multiple sensors. For example, a computing system 700 may include both a power and a temperature sensor.

The computing system 700 may include a resource regulation device 711. Resource regulation device 711 is configured to control a resource, such as power, water, gas, etc. The resource regulation device 711 may disconnect, reconnect, slow down, speed up, or otherwise adjust the resource. In some embodiments, the resource regulation device 711 may be remotely located from the computing system 700.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a flash memory, a ROM, a RAM, an ASIC, or any other medium from which a processing device can read instructions. The instructions may include processor-specific instructions generated by a compiler or an interpreter from code written in any suitable computer-programming language, including, for example, C, C++, C#, Visual Basic, Java, or scripting language.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more busses 706 are also included in the computing system 700. The bus 706 communicatively couples one or more components of a respective one of the computing system 700.

The computing system 700 may also include a diagnostic port 707. Diagnostic port 707 may be used, for example, by the equipment vendor or the utility company, to determine whether the computing system is operating correctly, or to diagnose and remedy issues, or perform a firmware upgrade of computing system 700.

The computing system 700 executes program code 730 that configures the processor 702 to perform one or more of the operations described herein. For example, the program code 730 causes the processor to perform the operations described in FIG. 3.

The computing system 700 also includes a network interface device 710. The network interface device 710 includes any device or group of devices suitable for establishing a wired or wireless data connection to one or more data networks. The network interface device 710 may be a wireless device and have an antenna 714. The computing system 700 can communicate with one or more other computing devices implementing the computing system or other functionality via a data network using the network interface device 710. Network interface device 710 enables communication with collectors 110a-n, PANs 120a-n, utility devices 140a-n, and so forth.

The computing system 700 can also include a display device 712. Display device 712 can be a LCD, LED, touch-screen or other device operable to display information about the computing system 700. For example, information could include an operational status of the computing system, network status, etc.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A utility network comprising:
a plurality of utility collectors connected to a backhaul network, wherein each of the plurality of utility collectors comprises a memory configured to store a copy of a distributed ledger; and
a plurality of personal area networks (PANs), wherein each of the plurality of utility collectors is connected to a corresponding PAN and is configured to act as a PAN coordinator for a corresponding set of utility devices on the corresponding PAN, wherein:
a first utility collector of the plurality of utility collectors is configured to:
request, via the backhaul network, an encryption key;
transmit, via the backhaul network, a request to join a distributed ledger system;
receive, via the backhaul network, an approval indicating that a threshold proportion of the plurality of utility collectors approve of the request to join the distributed ledger system and a current state of the distributed ledger;
instantiate the copy of the distributed ledger of the first utility collector using the current state of the distributed ledger, wherein the current state of the distributed ledger comprises information about the plurality of PANs and the sets of utility devices;
obtain information about utility devices associated with the first utility collector;
encrypt the information about the utility devices associated with the first utility collector with the encryption key and store the information in the distributed ledger; and wherein
a second utility collector of the plurality of utility collectors joined to the distributed ledger system is configured to:
identify that a particular utility collector of the plurality of utility collectors is unresponsive;
identify, from the copy of the distributed ledger of the second utility collector, the set of utility devices within a PAN of the unresponsive utility collector;
cause one or more of the set of utility devices within the PAN of the unresponsive utility collector to join the PAN of the second utility collector;
update the copy of the distributed ledger of the second utility collector to reflect the joining; and
transmit the update over the backhaul network.

2. The utility network of claim 1, wherein requesting the encryption key comprises transmitting a request to a head end system and wherein receiving the approval comprises receiving the approval from the head end system.

3. The utility network of claim 1, wherein
the distributed ledger comprises a plurality of blocks, each block representing a transaction between one or more collectors or utility devices,
the current state of the distributed ledger includes the plurality of blocks, and
the first utility collector is configured to instantiate a new block identifying the approval and store the new block in the copy of the distributed ledger of the first utility collector.

4. The utility network of claim 1, wherein the second utility collector is further configured to:
instantiate a new block comprising an indication that the first utility collector is unresponsive; and
store the new block in the copy of the distributed ledger of the second utility collector.

5. The utility network of claim 1, wherein the first utility collector is further configured to:
receive a firmware update for a utility collector;
determine, from the copy of the distributed ledger of the first utility collector, that the firmware update has not been applied to the first utility collector;
apply the firmware update to the first utility collector;
instantiate a new block indicating that the firmware update has been applied to the first utility collector;
add the new block to the copy of the distributed ledger of the first utility collector; and
transmit the new block to at least one other collector.

6. The utility network of claim 1, wherein the first utility collector is further configured to:
receive a firmware update for a utility device;
apply the firmware update to at least one utility device of the set of utility devices corresponding to the first utility collector;
instantiate a new block indicating that the firmware update has been applied to the utility device;
add the new block to the copy of the distributed ledger of the first utility collector; and
transmit the new block to at least one other collector.

7. The utility network of claim 1, wherein identifying the set of utility devices within the PAN of the unresponsive utility collector comprises accessing, from the copy of the distributed ledger of the second utility collector, information about a first network topology of the PAN associated with the first utility collector, and determining the set of utility devices from the information about the first network topology.

8. The utility network of claim 1, wherein the second utility collector of the plurality of utility collectors is further configured to:
access, from the copy of the distributed ledger of the second utility collector, a link quality index of a block associated with the first utility collector; and
responsive to determining that the link quality index is less than a link quality threshold:
identify, from the copy of the distributed ledger of the second utility collector, the set of utility devices within the PAN of the first utility collector;
cause one or more of the set of utility devices within the PAN of the first utility collector to join the PAN of the second utility collector;
update the copy of the distributed ledger of the second utility collector to reflect the joining; and
transmit the update over the backhaul network.

9. A utility network comprising:
a plurality of utility collectors connected to a backhaul network, wherein each of the plurality of utility collectors comprises a memory configured to store a copy of a distributed ledger; and
a plurality of personal area networks (PANs), wherein each of the plurality of utility collectors is connected to a corresponding PAN and is configured to act as a PAN coordinator for a corresponding set of utility devices on the corresponding PAN, wherein:
a first utility collector of the plurality of utility collectors is configured to:
request, via the backhaul network, an encryption key;
transmit, via the backhaul network, a request to join a distributed ledger system;

receive, via the backhaul network, an approval indicating that a threshold proportion of the plurality of utility collectors approve of the request to join the distributed ledger system and a current state of the distributed ledger;
decrypt, using the encryption key, the current state of the distributed ledger;
instantiate the copy of the distributed ledger of the first utility collector using the decrypted current state of the distributed ledger, wherein the current state of the distributed ledger comprises information about the plurality of PANs and the sets of utility devices;
and wherein
a second utility collector of the plurality of utility collectors joined to the distributed ledger system is configured to:
receive a firmware update for a utility collector;
determine, from the copy of the distributed ledger of the second utility collector, that the second utility collector is using a firmware version other than the firmware update;
apply the firmware update to the second utility collector;
instantiate a new block indicating that the firmware update has been applied to the second utility collector;
add the new block to the copy of the distributed ledger of the second utility collector; and
transmit the new block to at least one other collector.

10. The utility network of claim 9, wherein
the distributed ledger comprises a plurality of blocks, each block representing a transaction between one or more collectors or utility devices,
the current state of the distributed ledger includes the plurality of blocks, and
the first utility collector is configured to instantiate a new block identifying the approval and store the new block in the copy of the distributed ledger of the first utility collector.

11. The utility network of claim 9, wherein the second utility collector is further configured to:
responsive to transmitting one or more network pings to the first utility collector:
identify that the first utility collector is unresponsive,
instantiate a new block indicating that the first utility collector is unresponsive; and
store the new block in the copy of the distributed ledger of the second utility collector, and transmitting the new block to at least one other collector.

12. The utility network of claim 11, wherein transmitting the new block over the backhaul network causes an additional utility collector to receive the new block and apply the new block to a respective copy of the distributed ledger.

13. The utility network of claim 9, wherein transmitting the new block over the backhaul network causes an additional utility collector to determine, from the new block, that the firmware update is available and apply the firmware update to the additional utility collector.

14. The utility network of claim 9, wherein the second utility collector of the plurality of utility collectors is further configured to, responsive to transmitting one or more network pings to the first utility collector:
identify, from the copy of the distributed ledger of the second utility collector, the information about a first network topology of a PAN associated with the first utility collector;
cause one or more of the set of utility devices within the PAN of the first utility collector to join the PAN of the second utility collector;
update the copy of the distributed ledger of the second utility collector to reflect the joining; and
transmit the update over the backhaul network.

15. The utility network of claim 9, wherein the first utility collector is further configured to:
receive a firmware update for a utility collector;
determine, from the copy of the distributed ledger of the first utility collector, that the firmware update has not been applied to the first utility collector;
apply the firmware update to the first utility collector;
instantiate a new block indicating that the firmware update has been applied to the first utility collector;
add the new block to the copy of the distributed ledger of the first utility collector; and
transmit the new block to at least one additional collector.

16. A utility network comprising:
a plurality of utility collectors connected to a backhaul network, wherein each of the plurality of utility collectors comprises a memory configured to store a copy of a distributed ledger; and
a plurality of personal area networks (PANs), wherein each of the plurality of utility collectors is connected to a corresponding PAN and is configured to act as a PAN coordinator for a corresponding set of utility devices on the corresponding PAN, wherein:
a first utility collector of the plurality of utility collectors is configured to:
transmit, via the backhaul network, a request to join a distributed ledger system;
receive, via the backhaul network, an approval indicating that a threshold proportion of the plurality of utility collectors approve of the request to join the distributed ledger system and a current state of the distributed ledger;
instantiate the copy of the distributed ledger of the first utility collector using the current state of the distributed ledger, wherein the current state of the distributed ledger comprises information about the plurality of PANs and the sets of utility devices;
obtain a first network topology about utility devices associated with the first utility collector;
store information about the first network topology in the distributed ledger; and wherein
a second utility collector of the plurality of utility collectors joined to the distributed ledger system is configured to:
responsive to transmitting one or more network pings to the first utility collector, identifying that the first utility collector is unresponsive;
access, from the copy of the distributed ledger of the second utility collector, the information about the first network topology;
identify, from the information about the first network topology, one more utility devices of the set of utility devices;
cause the one or more utility devices to join a PAN of the second utility collector.

17. The utility network of claim 16, wherein the second utility collector is further configured to:
determine, from the copy of the distributed ledger of the second utility collector, a version of an application executing on the second utility collector;
responsive to determining that the version is less than a current version, accessing an application update corresponding to the current version and applying the application update to the second utility collector;

instantiate a new block indicating that the application update has been applied to the second utility collector;

add the new block to the copy of the distributed ledger of the second utility collector; and transmit the new block to at least one other collector.

18. The utility network of claim 16, wherein the distributed ledger comprises a plurality of blocks, each block representing a transaction between one or more collectors or utility devices, the current state of the distributed ledger includes the plurality of blocks, and the first utility collector is configured to instantiate a new block identifying the approval and store the new block in the copy of the distributed ledger of the first utility collector.

19. The utility network of claim 16, wherein the second utility collector is further configured to:

update the copy of the distributed ledger of the second utility collector to reflect the joining; and transmit the update over the backhaul network.

20. The utility network of claim 16, wherein the first utility collector is further configured to:

receive a firmware update for a utility collector;

determine, from the copy of the distributed ledger of the first utility collector, that the firmware update has not been applied to the first utility collector;

apply the firmware update to the first utility collector;

instantiate a new block indicating that the firmware update has been applied to the first utility collector;

add the new block to the copy of the distributed ledger of the first utility collector; and transmit the new block to at least one other collector.

* * * * *